(12) United States Patent
Deck et al.

(10) Patent No.: US 11,387,543 B2
(45) Date of Patent: Jul. 12, 2022

(54) FIELD DEVICE HAVING A METAL HOUSING, A CONNECTION LINE GUIDED THROUGH A CABLE BUSHING AND A RADIO MODULE HAVING AN ANTENNA

(71) Applicant: VEGA GRIESHABER KG, Wolfach (DE)

(72) Inventors: Thomas Deck, Wolfach (DE); Karl Griessbaum, Muehlenbach (DE); Juergen Motzer, Gengenbach (DE); Daniel Schultheiss, Hornberg (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 16/762,431

(22) PCT Filed: Mar. 8, 2019

(86) PCT No.: PCT/EP2019/055854
§ 371 (c)(1),
(2) Date: May 7, 2020

(87) PCT Pub. No.: WO2019/175051
PCT Pub. Date: Sep. 19, 2019

(65) Prior Publication Data
US 2021/0218122 A1 Jul. 15, 2021

(30) Foreign Application Priority Data

Mar. 14, 2018 (DE) ................... 10 2018 105 903.5

(51) Int. Cl.
*H01Q 1/22* (2006.01)
*H01Q 1/46* (2006.01)

(52) U.S. Cl.
CPC ............... *H01Q 1/225* (2013.01); *H01Q 1/46* (2013.01)

(58) Field of Classification Search
CPC .................................. H01Q 1/46; H01Q 1/225
See application file for complete search history.

(56) References Cited

U.S. PATENT DOCUMENTS 6,980,174 B2 * 12/2005 Flasza ...................... H01Q 1/50
343/850
2020/0185812 A1 * 6/2020 Schauble ............. H01Q 9/0471

FOREIGN PATENT DOCUMENTS

| DE | 10 2010 043031 A1 | 5/2012 |
| WO | WO2013/017636 A1 | 2/2013 |
| WO | WO2016/058827 A1 | 4/2016 |

OTHER PUBLICATIONS

International search report for related PCT application PCT/2019/055854 dated May 27, 2019.

* cited by examiner

*Primary Examiner* — Daniel Munoz
(74) *Attorney, Agent, or Firm* — William Gray Mitchell

(57) ABSTRACT

A field device having a metal housing, a connection line guided through a cable bushing and a radio module having an antenna, wherein the antenna extends, at least in sections, outside of the housing parallel to the connection line and in the cable bushing.

10 Claims, 1 Drawing Sheet

FIELD DEVICE HAVING A METAL HOUSING, A CONNECTION LINE GUIDED THROUGH A CABLE BUSHING AND A RADIO MODULE HAVING AN ANTENNA

CROSS REFERENCE TO RELATED APPLICATIONS

This patent application claims priority to International Patent Application PCT/EP2019/055854, filed on Mar. 8, 2019, and thereby to German Patent Application 102018105903.5, filed on Mar. 14, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a field device having a metal housing, a connection line guided through a cable bushing and a radio module having an antenna.

Background of the Invention

The present invention relates to a field device having a metal housing, a connection line guided through a cable bushing, and a radio module having an antenna.

In process automation technology, many different types of field devices are used, which serve to detect and/or influence process variables. Examples of such field devices are fill level gauges, limit gauges, and pressure gauges having sensors that detect the relevant process variables of fill level, limit, or pressure. Frequently, such field devices are connected to superordinate units, for example guide systems or control units. These superordinate units serve to control, visualize, and/or monitor the process.

Frequently, field devices having metal housings are used due to their mechanical stability and resistance against environmental influences. When using field devices in environments at risk of explosion, these devices must meet certain specifications that also require the use of metal housings. For example, for the explosion protection type pressurized encapsulation (Ex-d), the housing of a field device may not burst in case of explosive pressure within the housing, which is typically achieved by way of a housing of a metallic design. For the ignition protection type pressurized encapsulation, the components that can trigger an ignition, for example a flammable gas, are built inside a housing that withstands the explosive pressure. The openings of the housing are designed such that a transfer of the explosion outwardly is prevented. All closures and bushings of the housing must be designed according to this ignition protection type and thus can sometimes be very expensive to create.

From the prior art, it is known for example to use radio modules for easier operation and calibration of field devices. An operation and calibration via radio modules facilitates the work of the operator on site, because the field device, for example for the purposes of calibration, does not need to be opened and possibly completely taken out of operation in environments at risk of explosion.

However, a use of radio modules contradicts the housings made of metal. If a radio transmitter/receiver is situated inside the sensor housing along with the remaining sensor electronics of a fill level sensor, then metallic housing walls prevent the propagation of electromagnetic waves and thus prevent the desired radio connection.

Thus, from the prior art, it is known to equip metal housings with a glass window, which is used in order to read an installed display and simultaneously to allow a radio connection through the glass window. However, it is found to be disadvantageous that such a radio connection is subject to a strong directional effect and thus has limited usability.

It is further known to guide a communication signal via a coaxial line through a separate cable bushing through the housing and to feed this signal to an outer antenna mounted there. Here, it is found to be disadvantageous that an additional cable bushing is required and must be designed in an accordingly explosion-proof manner.

The task of the present invention is to further develop a field device having a metal housing and a radio module and to overcome the disadvantages known from the prior art.

This task is solved by way of a field device having the features according to patent claim 1. Advantageous further developments are the subject of dependent patent claims.

BRIEF SUMMARY OF THE INVENTION

In a preferred embodiment, a field device (1) having a metal housing (3), a connection line (7) guided through a cable bushing (5), and a radio module (9) having an antenna (11), characterized in that the antenna (11) extends, at least in sections, outside of the housing (3), parallel to the connection line (7) and in the cable bushing (5).

In another preferred embodiment, the field device (1) as described herein, characterized in that the antenna (11) is configured as a dipole antenna, in particular as a $\lambda/4$ or $\lambda/2$ dipole.

In another preferred embodiment, the field device (1) as described herein, characterized in that the antenna (11) is configured as a rod antenna, in particular as a $\lambda/4$ or $\lambda/2$ wire stub antenna.

In another preferred embodiment, the field device (1) as described herein, characterized in that the antenna (11) is completely arranged in the cable bushing (5).

In another preferred embodiment, the field device (1) as described herein, characterized in that the antenna (11) is overmolded with the cable bushing (5).

In another preferred embodiment, the field device (1) as described herein, characterized in that a portion of the connection line (7) is connected to the radio module (9) and used as an antenna (11).

In another preferred embodiment, the field device (1) as described herein, characterized in that a shield (13) of the connection line (7) is connected to the radio module (9) and used as an antenna (11).

In another preferred embodiment, the field device (1) as described herein, characterized in that the shield (13) is grounded, preferably to the housing (3), via a frequency-selective circuit (15).

In another preferred embodiment, the field device (1) as described herein, characterized in that the frequency-selective circuit (15) is configured such that it is high-ohmic at a transmitting and receiving frequency (f) of the radio module (9).

In another preferred embodiment, the field device (1) as described herein, characterized in that a transmitting and receiving frequency (f) of the radio module (9) lies between 400 MHz and 10 GHz, preferably between 2 GHz and 8 GHz.

DETAILED DESCRIPTION OF THE INVENTION

Figure 1:
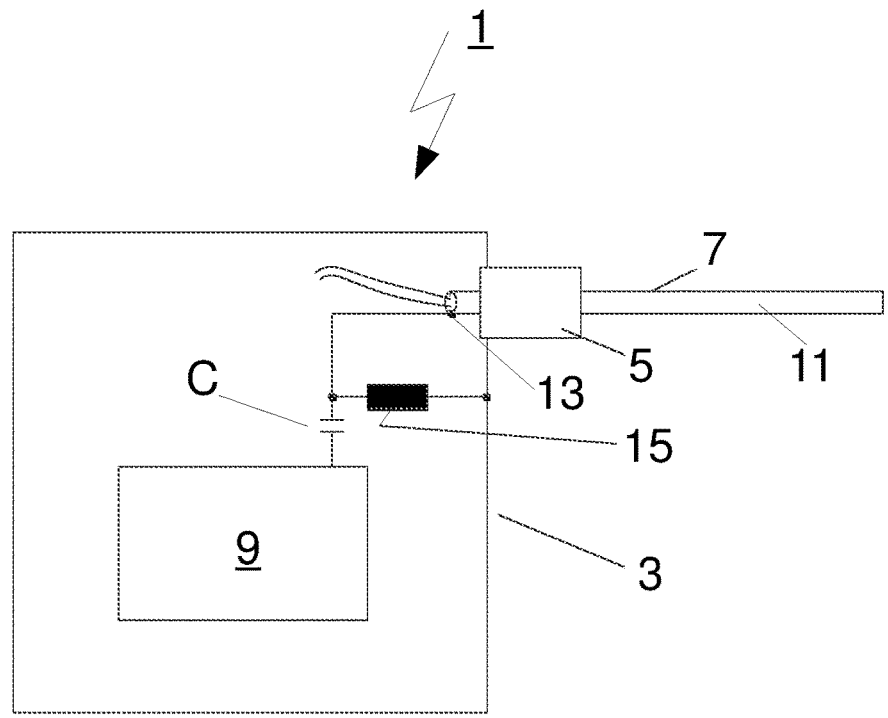
FIG. 1 is a line drawing evidencing a first embodiment of a field device according to the present application.

A field device according to the invention, having a metal housing, a connection line guided through a cable bushing, and a radio module having an antenna, is characterized in that the antenna extends, at least in sections, outside of the housing, parallel to the connection line and in the cable bushing.

What is decisive for the solution according to the invention is that both the connection line and the antenna are guided through a common opening of the housing. It is thus possible and preferred for the housing to have only a single cable bushing.

The antenna can be configured as a dipole antenna, in particular as a λ/4 or λ/2 dipole. A configuration of the antenna as a rod antenna, in particular as a λ/4 or λ/2 wire stub antenna, is also conceivable.

A wire stub antenna is understood to mean an antenna made of a piece of wire or another conductor, which preferably has a length of λ/4.

At frequencies of multiple GHz, it is thus possible for the antenna to be arranged completely in the cable bushing. A compact arrangement is hereby achieved, which does not require any additional extensions.

The configuration is particularly simple and compact if the antenna is overmolded with the cable bushing. The antenna can be imbedded in the cable bushing in particular during the manufacture of the latter and overmolded with plastic.

Alternatively to an arrangement of the antenna in the cable bushing, a portion, i.e. in particular a wire or shield, can be connected to the connection line with the radio module and used as an antenna. It is thus possible to use an additional wire of the connection line or a shield of the connection line as an antenna.

When using the shield, it is advantageous for the shield to be grounded, preferably to the housing, via a frequency-selective circuit. By way of a frequency-selective circuit, the function of the shield, e.g. shielding and diverting electromagnetic faults, can continue to be used, and the antenna function can simultaneously be implemented.

For this purpose, the frequency-selective circuit is preferably configured such that it is high-ohmic at a transmission and receiving frequency of the radio module. In this manner, the radio signals on the transmission frequency of the radio module are not diverted to the housing mass but rather guided to the antenna, respectively to the shield of the connection line, for transmission. In the case of receiving, received radio signals are similarly not diverted to the housing mass but rather guided to the radio module for further processing. For electromagnetic faults, the frequency-selective circuit is preferably low-ohmic, i.e. permeable, and diverts these to the housing mass.

The transmitting and receiving frequency of the radio module is preferably between 400 MHz and 10 GHz. In this frequency range, all customary radio standards for data communication via radio, in particular Bluetooth, wireless HART, ZIGBEE, WLAN, mobile radio (GSM, LTE, etc.) and LoRa (Long Range Wide Area Network), are covered.

The present invention is explained in detail below by way of embodiments with reference to the attached figures.

DETAILED DESCRIPTION OF THE FIGURES

FIG. 1 shows a pictorial diagram of a first embodiment of a field device 1 according to the present application.

For the sake of visibility, the field device 1 is only shown schematically in FIG. 1. In order to explain the concept underlying the present application, only a metal housing 3 of the field device 1 as well as a radio module 9 arranged in the metal housing 3 are shown. Multiple further components, in particular an electronic system, an energy supply, and any present sensor system, are not shown.

The metal housing 3 has a cable bushing 5, which seals off an opening in the metal housing 3 according to the applicable explosion protection regulations. A connection line 7 is guided through the cable bushing 3 from an exterior of the metal housing 3 into the interior of the housing.

In the present embodiment, the metal housing 3 and the cable bushing are configured in the ignition protection type pressured encapsulation, which is also called Ex-d.

In the present embodiment, the metal housing 3 has a single cable bushing 5, through which the connection line 7 is guided. This is particularly advantageous, because further cable bushings would have as a result a correspondingly high sealing expense, which can be avoided in this manner.

In the present embodiment, the connection line is configured as a two-wire line having a shield 13. This is a typical configuration that on the one hand enables a transmission of a measurement value to a superordinate unit, e.g. a control room, via the 4-20 mA protocol and/or a bidirectional communication with the field device, e.g. via the HART protocol, and on the other hand supplies the field device with energy via the 4-20 mA current loop.

The radio module 9 is connected to a shield 13 of the connection line 7 at its transmitting and receiving connection via a capacity C, which ensures a galvanic isolation. The shield 13 is further connected to the housing 3, respectively the housing mass, via a frequency-selective circuit 15, e.g. a band-elimination filter. Here, the frequency-selective circuit 15 is configured such that it is high-ohmic at a transmitting and receiving frequency f of the radio module 9 and simultaneously diverts other frequencies, in particular in the range of electromagnetic faults, to the housing mass.

It is thus possible for the shield 13 to continue fulfilling its original task, namely the shielding and diverting of electromagnetic faults and simultaneously to be used as an antenna in the range of the transmitting and receiving frequency f of the radio module 9.

A transmission signal provided by the radio module 9 is thus guided through the cable bushing 5 from the metal housing 3 without any additional constructive expense and can be transmitted there without impairment.

Alternatively to the circuit 13 of the connection line 7, an additional, otherwise unused wire of the connection line can be used as the antenna 11. In this configuration, the frequency-selective circuit 15 can be omitted, because the shield 13 of the connection line 7 can be ordinarily connected to the housing. Here, in order to enable a transmission of the radio signal, it should be noted that the additional wire may not be shielded, because the shielding would otherwise prevent a transmission.

In a further alternative, the connection line 7 can also be configured as a special cable. For example, a multiple-shielded, e.g. double-shielded, cable can be used, and an outer shield can be used as the antenna 11 for the purposes of the present application, while an inner shield is connected to the housing. In this case, as well, a frequency-selective circuit 15 can be omitted.

Figure 2:
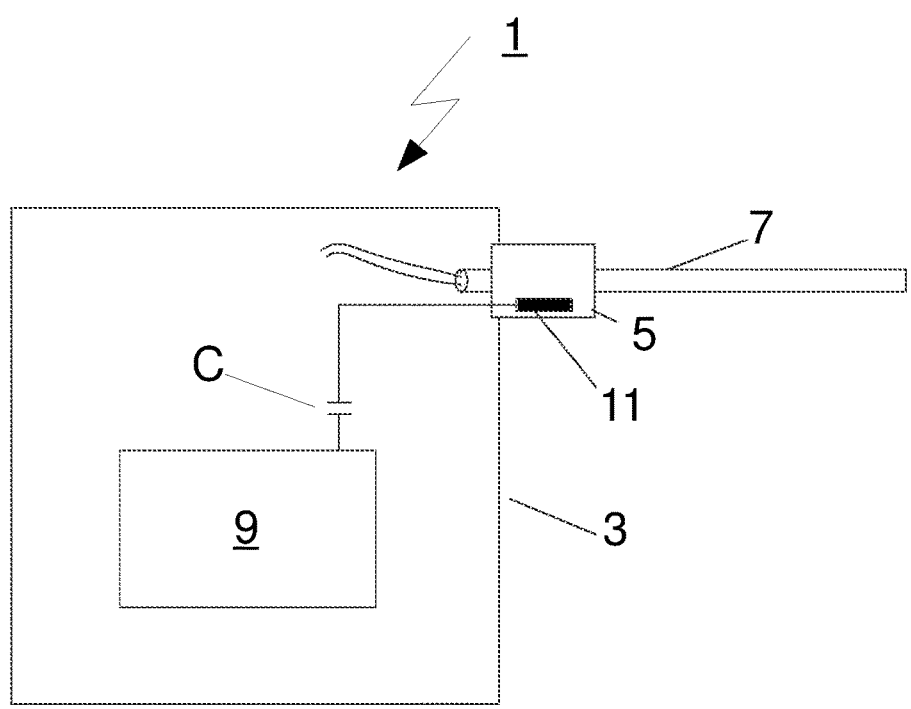
FIG. 2 is a line drawing evidencing a second embodiment of a field device according to the present application.

FIG. 2 shows a further embodiment of a field device according to the present application.

In this embodiment, the radio module 9 is connected via a capacity C, which ensures a galvanic isolation, to an antenna 11, which is configured as a rod antenna, in the present case as a wire stub antenna. The antenna 11 is imbedded in a modified cable bushing 5. In the present embodiment, the antenna 11 is overmolded in the cable bushing 5, which is made from a plastic, with the plastic of the cable bushing already during the manufacture of the cable bushing 5, so that only an electrical connection to the radio module 9 needs to be created.

Alternatively, the antenna can be arranged in a recess of the cable bushing 7 or imbedded in a seal arranged in the cable bushing 7.

What is decisive for the concept underlying the present application is that, by way of an arrangement outside of the metal housing 3, an antenna 11 is achieved, wherein a cable bushing that is already present and otherwise in use is used for transferring the radio signal from the interior of the metal housing 3 outwards.

LIST OF REFERENCE NUMBERS

1 Field device
3 Metal housing
5 Cable bushing
7 Connection line
9 Radio module
11 Antenna
13 Shield
15 Frequency-selective circuit
f Transmitting and receiving frequency The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A field device having a metal housing, a connection line guided through a cable bushing, and a radio module having an antenna, wherein the antenna extends, at least in sections, outside of the housing, parallel to the connection line and in the cable bushing, wherein the antenna is completely arranged in the cable bushing and the antenna is overmolded with the cable bushing.

2. The field device of claim 1, wherein the antenna is configured as $\lambda/4$ or $\lambda/2$ dipole antenna as a.

3. The field device of claim 1, wherein the antenna is configured as a rod antenna.

4. The field device of claim 1, wherein a portion of the connection line is connected to the radio module and used as an antenna.

5. The field device of claim 4, wherein a shield of the connection line is connected to the radio module and used as an antenna.

6. The field device of claim 5, wherein the shield is grounded to the housing via a frequency-selective circuit.

7. The field device of claim 6, wherein the frequency-selective circuit is configured such that it is high-ohmic at a transmitting and receiving frequency of the radio module.

8. The field device of claim 1, wherein a transmitting and receiving frequency of the radio module lies between 400 MHz and 10 GHz.

9. The field device of claim 1, wherein a transmitting and receiving frequency of the radio module lies between 2 GHz and 8 GHz.

10. The field device of claim 1, wherein the antenna is configured as a $\lambda/4$ or $\lambda/2$ wire stub antenna.

* * * * *